United States Patent [19]

Morishita et al.

[11] Patent Number: 4,513,239
[45] Date of Patent: Apr. 23, 1985

[54] APPARATUS FOR CONTROLLING A CHARGING GENERATOR

[75] Inventors: Mitsuharu Morishita; Shinichi Kouge, both of Hyogo, Japan

[73] Assignee: Mitsubishi Denki Kabushiki Kaisha, Japan

[21] Appl. No.: 472,826

[22] Filed: Mar. 7, 1983

[30] Foreign Application Priority Data

| Mar. 9, 1982 | [JP] | Japan | 57-38917 |
| Mar. 9, 1982 | [JP] | Japan | 57-38918 |
| Mar. 9, 1982 | [JP] | Japan | 57-38919 |
| Mar. 23, 1982 | [JP] | Japan | 57-47926 |
| Mar. 23, 1982 | [JP] | Japan | 57-47928 |

[51] Int. Cl.³ .............................................. H02J 7/14
[52] U.S. Cl. ........................................ 322/99; 320/64
[58] Field of Search ..................... 322/28, 99; 320/64, 320/68, 61

[56] References Cited

U.S. PATENT DOCUMENTS

| 3,764,879 | 10/1973 | Hill | 322/99 X |
| 4,121,146 | 10/1978 | Hill | 322/99 X |
| 4,143,313 | 3/1979 | Arendt | 322/99 X |
| 4,266,181 | 5/1981 | Muto et al. | 322/28 |
| 4,362,982 | 12/1982 | Akita et al. | 322/28 X |

Primary Examiner—R. J. Hickey
Attorney, Agent, or Firm—Sughrue, Mion, Zinn, Macpeak, and Seas

[57] ABSTRACT

Current flowing through the field coil of a charging generator is turned on and off to control an output voltage of the charging generator. A charging indicator lamp is used to indicate malfunctions such as wire breakage in an exciter circuit, detachment of a terminal of a storage battery, and the uncontrolled operation of a control circuit, for preventing the storage battery from being excessively charged or discharged. The energization of the charging indicator lamp 6 is controlled by controlling a switching element between the charging indicator lamp and ground with a signal indicative of a detected malfunction.

14 Claims, 12 Drawing Figures

APPARATUS FOR CONTROLLING A CHARGING GENERATOR

BACKGROUND OF THE INVENTION

The present invention relates to an apparatus for controlling a charging generator.

Prior devices for controlling charging generators fail to indicate malfunctions such as wire breakage in the exciter circuit of the charging generator causing the latter to generate no voltage, and uncontrolled charging in which the storage battery is continuously charged without control. Should these malfunctions occur, the storage battery is excessively discharged or charged, respectively.

SUMMARY OF THE INVENTION

It is an object of the present invention to provide an apparatus for controlling the output voltage of a charging generator by turning a current flowing through a field coil of the charging generator on and off, the apparatus being capable of enabling a charging indicator lamp to indicate malfunctions such as wire breakage, terminal detachment, or control circuit failure, for preventing the storage battery from being excessively charged or discharged.

According to the present invention, no power generation malfunction is detected by setting a voltage at a voltage setting terminal of a field coil switching element so as to be smaller than a second preset value, and an uncontrolled voltage output malfunction is detected by setting a third preset value. Detachment of a first rectifier output terminal is detected by the fact that the output voltage exceeds the third preset value in certain intervals. As a result, the storage battery is prevented from being completely discharged in the event of no power generation or detachment of the first rectifier output terminal. The storage battery is also protected from being excessively charged, and an electrical load is prevented from being broken or damaged when an uncontrolled voltage output is produced.

The above and other objects, features and advantages of the present invention will become more apparent from the following description when taken in conjunction with the accompanying drawings, in which preferred embodiments of the present invention are shown by way of illustrative example.

DETAILED DESCRIPTION OF THE PREFERRED EMBODIMENTS

Figure 1:
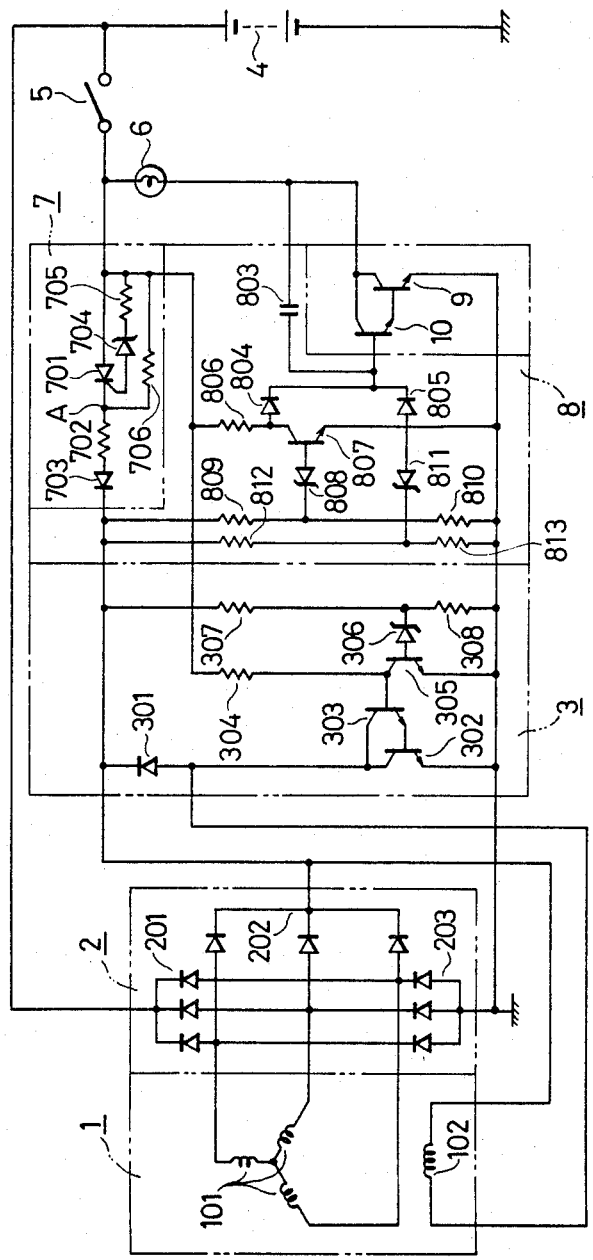
FIG. 1 is a circuit diagram of an apparatus for controlling a charging generator according to a first embodiment of the present invenion.

A three-phase a.c. generator 1 is installed in a car (not shown) and made drivable by an engine thereof (not shown). The generator 1 has three-phase star-connected armature coils 101 and a field coil 102. An a.c. output from the generator 1 is rectified by a fullwave rectifier 2 having a first rectifier output terminal 201, a second rectifier output terminal 202, and a ground terminal 203. A voltage regulator 3 serves to control an output voltage from the generator 1 so as to equal a first preset value by controlling the field current flowing through the field coil 102.

The voltage regulator 3 comprises a surge absorber diode 301 connected across the field coil 102, a pair of Darlington-connected power transistors 203, 303 for turning the current passing through the field coil 102 on and off, a resistor 304 connected to the base of the transistor 303, a control transistor 305 for turning the transistors 302, 303 on and off, a zener diode 306 which can be rendered conductive when a voltage detected thereby at the second rectifier output terminal 202 of the generator 1 reaches a first preset value, and a pair of series-connected resistors 307, 308 forming a voltage divider. Designated at 4 is the storage battery to be charged by the charging generator 1, and 5 a key-operated switch.

A switch unit 7 is composed of a thyristor 701 energizable when the generator 1 starts operating for passing an initial excitation current through the field coil 102, a resistor 702 for setting the initial excitation current, a diode 703 for preventing reverse current from flowing through the switch unit 7 during power generation, a zener diode 704 energizable when the voltage difference between the storage battery 4 and a point A exceeds a preset value when the key-operated switch 5 is closed, for supplying a gate current to the thyristor 701, a resistor 705 for setting the gate current flowing to the thyristor 701, and a resistor 706 for setting a voltage at the point A below a second preset value when the exciter circuit is subjected to wire breakage. A pair of Darlington-connected transistors 9, 10 serving as a switch element are connected in series with the charging indicator lamp 6.

A diagnostic device 8 comprises a ripple absorber capacitor 803 shunted across the Darlington-connected transistors 9, 10, a pair of diodes 804, 805 connected in the form of an OR gate, a resistor 806 connected through the diode 804 in series to the base of the transistor 10, a transistor 807 which is de-energizable when the voltage at the second rectifier output terminal 202 is below the second preset value, indicative of no power generation, for allowing a base current to flow through the resistor 806 and the diode 804 to the transistors 9, 10 to render these transistors conductive, and a zener diode 808 connected in series with the base of the transistor 807 and rendered conductive when the voltage at the second rectifier output terminal 202 is higher than the second preset voltage. A pair of series-connected resistors 809, 810 serve as a voltage divider for dividing the voltage at the second rectifier output terminal 202. A zener diode 811 is rendered conductive when the voltage at the second rectifier output terminal 202 is higher than a third preset value representing an uncontrolled voltage output. Another series-connected pair of resistors 812, 813 also serve as a voltage divider for dividing the voltage at the second rectifier output terminal 202. When the voltage at the second rectifier output terminal 202 is higher than the third preset value representative of the uncontrolled voltage output, the resistors 812, 813 cause a base current to flow through the diode 805 and the zener diode 811 to the transistors, 9, 10 to render these transistors conductive.

The operation of the apparatus thus constructed is as follows: The voltage at the point A in the switch unit 7 at the time of wire breakage in the exciter circuit is selected to be lower than the second preset value which is indicative of no power generation. The voltage at the point A is determined by the ratio of the resistance of the resistor 706 to the resistance between the second rectifier output terminal 202 and ground plus the resistance of the resistor 702, and can be selected so as to be lower than the second preset value by adjusting the resistor 706. The zener voltage of the zener diode 704 is selected to be higher than the voltage difference between the voltage of the storage battery 4 and the voltage at the point A so that the thyristor 701 will remain nonconductive in the event of wire breakage in the exciter circuit. When the charging generator 1 is to be started, the zener voltage is selected to be lower than the above voltage difference so that the zener diode 704 will be rendered conductive at the time of the starting operation of the charging generator 1.

When the key-operated switch 5 is closed to start the engine, the voltage difference between the storage battery 4 and the point A becomes higher than the zener voltage of the zener diode 704. The thyristor 701 is then rendered conductive by a trigger current flowing from the storage battery 4 through the resistor 705 and the zener diode 704. In response to the energization of the thyristor 701, an initial excitation current flows through the field coil 102 in a loop composed of the storage battery 4, the key-operated switch 5, the thyristor 701, the resistor 702, the diode 703, the field coil 102, and the transistors 302, 303. A magnetomotive force is now induced across the field coil 102. The initial excitation current can be set by adjusting the resistor 702.

When the engine is started at this time, the generator 1 is driven to induce an a.c. output in the armature coils 101 dependent upon the PRM of the generator 1, the a.c. output being rectified by the full-wave rectifier 2. When the rectified output is lower than the first preset value, the potential at the dividing point between the resistors 307, 308 is low enough to maintain the zener diode 306 nonconductive. The field current keeps being supplied to the field coil 102, and the output voltage of the generator 1 increases as the RPM of the generator 1 increases. When the output voltage of the generator 1 substantially increases to a level higher than the first preset value, the potential at the dividing point between the resistors 307, 308 is high enough to render the zener diode 306 conductive, whereupon the transistor 305 is supplied with base current and energized. When the transistor 305 is turned on, the transistors 302, 303 are turned off to cut off the current that has been passing through the field coil 102, thus lowering the output voltage of the generator 1. When the output voltage from the generator 1 is lowered to the first preset vlaue, the zener diode 306 and the transistor 305 are rendered nonconductive. The transistors 302, 303 are again made conductive to energize the field coil 102, again increasing the output voltage from the generator 1. The above cycle of operation is repeated to control the output voltage of the generator 1 to equal the first preset value, and the storage battery 4 is charged by the controlled voltage.

When power generation is started, the voltage at the second rectifier output terminal 202 is lower than the second preset value, and hence the zener diode 808 is rendered nonconductive to turn off the transistor 807. A base current then flows the transistors 9, 10 through the resistor 806 and the diode 804 to energize the transistors 9, 10, whereupon the charging indicator lamp 6 is turned on. When the engine is started to enable the generator 1 to generate an output voltage which is controlled to the first preset value by the voltage regulator, the output voltage at the second rectifier output terminal 202 exceeds the second preset value to render the zener diode 808 conductive, thereby turning on the transistor 806. The transistors 9, 10 are then de-energized to turn off the charging indicator lamp 6. At this time, the diode 703 prevents a current from flowing from the second rectifier output terminal 202 to the storage battery 4. If the field coil 102, which is part of the exciter circuit, the transistors 302, 303, or other wires happen to be opened or broken, the charging indicator lamp 6 is turned on since the voltage at the point A is selected to be lower than the second preset value at the time of such wire breakage, thus indicating no power generation. The transistor 807 and the zener diode 808 as combined can be replaced with a comparator circuit.

Figure 2:
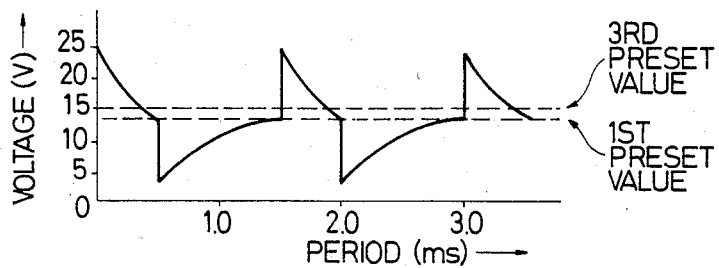
FIG. 2 is a diagram showing the waveform of an output voltage produced by the charging generator of FIG. 1 when it suffers from a malfunction.

When the output voltage of the generator 1 cannot be controlled to equal the first preset value and exceeds the third preset value indicative of an uncontrol voltage output due, for example, to a failure of the voltage regulator 3, the voltage at the dividing point between the resistors 812, 813 increases to the point where the zener diode 811 is rendered conductive. A base current is then passed through the diode 805 to the transistors 9, 10 to energize the charging indicator lamp 6. In case the generator 1 generates its output voltage but fails to charge the storage battery 4 due to detachment of the first rectifier output terminal 201, for instance, a voltage having a waveform as shown in FIG. 2 appears at the first and second rectifier output terminals 201, 202. There are intervals in which the voltage exceeds the third preset value, as shown in FIG. 2. During such intervals, the zener diode 811 is rendered conductive and the transistors 9, 10 are intermittently supplied with base current via the diode 805. However, the capacitor 803 allows the transistors 9, 10 to be maintained conductive, thus keeping the charging indicator lamp 6 energized. The zener diode 811 may be replaced with a comparator circuit.

Figure 3:
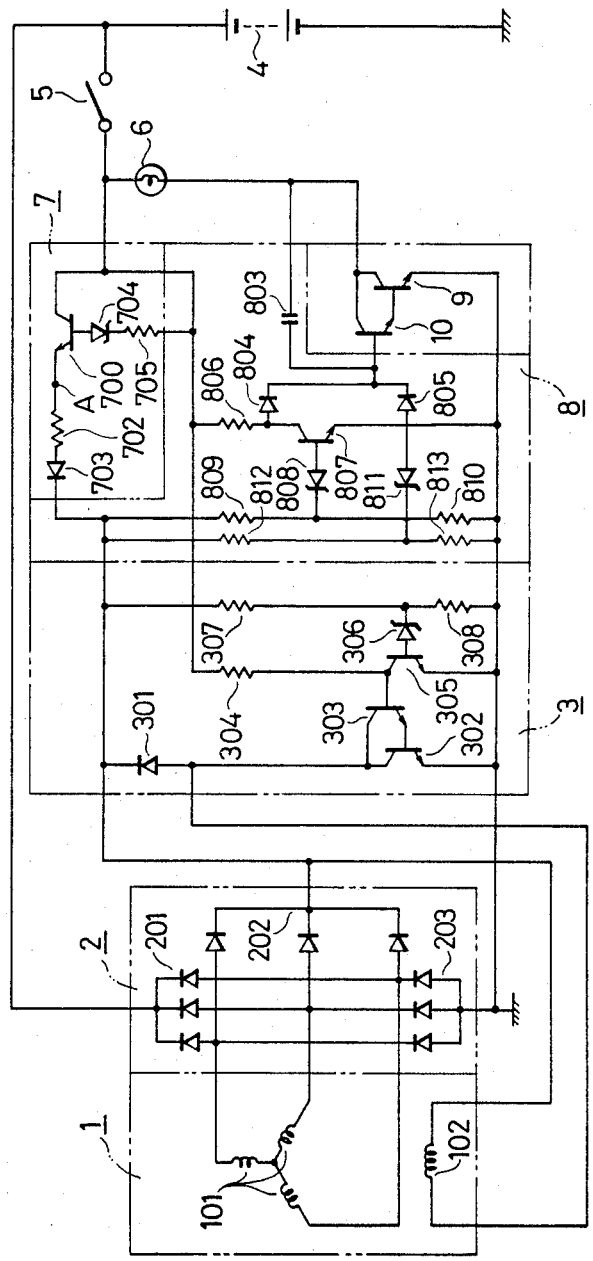
FIG. 3 is a circuit diagram of an apparatus for controlling a charging generator according to a second embodiment of the present invention.

While in the first embodiment shown in FIG. 1 the switch unit 7 is composed of the thyristor 701, it may comprise a transistor 700 according a second embodiment as shown in FIG. 3.

An apparatus according to a third embodiment will now be described with reference to FIG. 4. Identical or corresponding parts in FIG. 4 are denoted by the identical or corresponding reference characters as used in FIGS. 1 or 3, and thus will not be described in detail.

Figure 4:
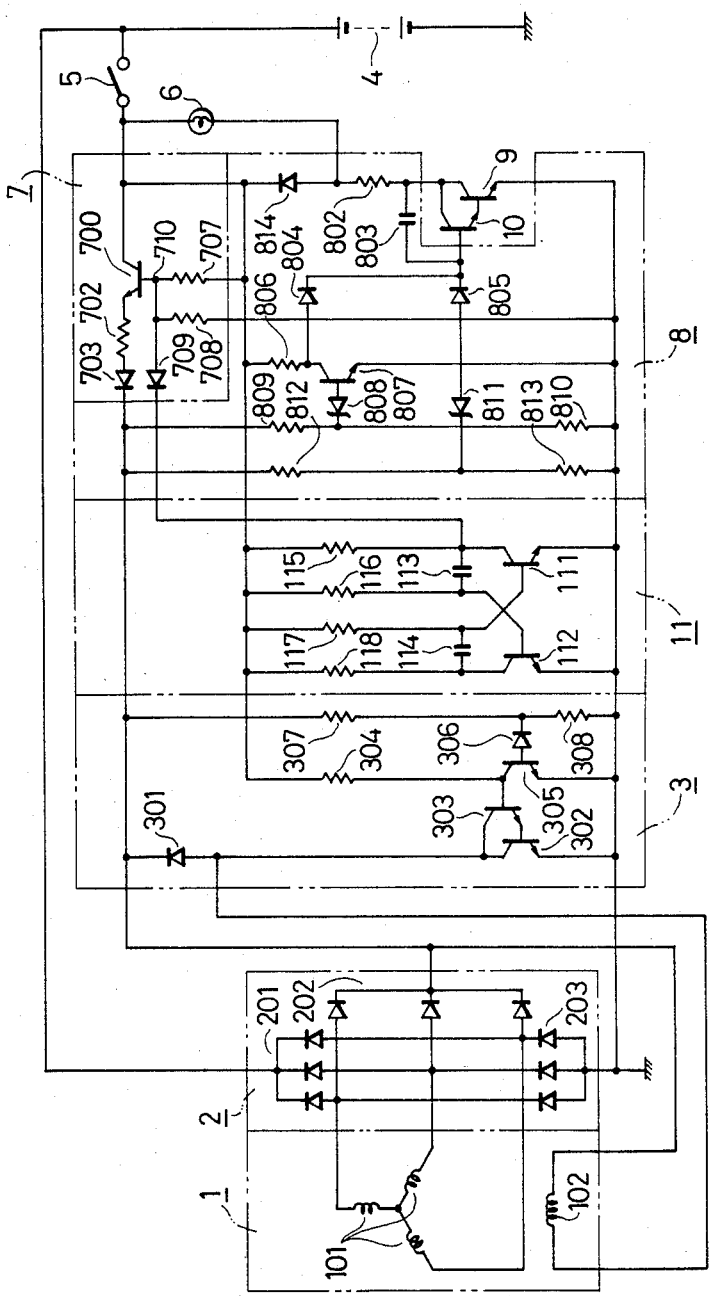
FIG. 4 is a circuit diagram of an apparatus for controlling a charging generator according to a third embodiment of the present invention.

Designated in FIG. 4 at 11 is an oscillator of known construction which is of general use. A switch unit 7 serves to supply the field coil 102 with an initial excitation current having a constant mean value with its setting variable when the generator 1 starts operating. When the exciter circuit suffers wire breakage, the switch unit 7 is turned on under a command of the oscillator 11 to set the voltage at the second rectifier output terminal 202 to a desired value.

The switch unit 7 is composed of a control transistor 700 for turning the initial excitation current on and off under the command of the oscillator 11, a resistor 702 connected in series with the emitter of the transistor 700 for setting a maximum initial excitation current, a diode 703 for preventing reverse current from flowing through the switch unit 7 when power is generated, a pair of series-connected resistors 707, 708 forming voltage divider for setting a voltage at a voltage setting terminal 710, and a diode 709 for transmitting an on/off command from the oscillator 11 to the switch unit 7. A pair of Darlington-connected transistors 9, 10 serving as a switch unit are connected in series between the charging indicator lamp 6 and ground.

A diagnostic device 8 serves to detect malfunctions and render the transistors 9, 10 conductive, thereby turning on the charging indicator lamp 6. The diagnostic device 8 includes a ripple absorber capacitor 803 shunted across the Darlington-connected transistors 9, 10, a resistor 802 for limiting a surge current flowing at the time of energization of the charging indicator lamp 6 and a current flowing due to erroneous wiring, a pair of diodes 804, 805 connected in the form of an OR gate, a resistor 806 connected through the diode 804 in series to the base of the transistor 10, a transistor 807 which is de-energizable when the voltage at the second rectifier output terminal 202 is below the second preset value indicative of no power generation, to allow a base current to flow through the resistor 806 and the diode 804 to the transistors 9, 10 to render these transistors conductive, and a zener diode 808 connected in series with the base of the transistor 807 and rendered conductive when the voltage at the second rectifier output terminal 202 is higher than the second preset voltage. A pair of series-connected resistors 809, 810 serve as a voltage divider for dividing the voltage at the second rectifier output terminal 202. A zener diode 811 is rendered conductive when the voltage at the second rectifier output terminal 202 is higher than a third preset value representing the uncontrolled voltage output. Another series-connected pair of resistors 812, 813 also serve as a voltage divider for dividing the voltage at the second rectifier output terminal 202. When the voltage at the second rectifier output terminal 202 is higher than the third preset value representative of the uncontrolled voltage output, the resistors 812, 813 cause a base current to flow through the zener diode 805 and the diode 805 to the transistors 9, 10 to render these transistors conductive. A diode 814 allows the charging indicator lamp 6 to be turned on when the wire between the junction between the key-operated switch 5 and the charging indicator lamp 6 and the transistor 700 is disconnected.

The apparatus according to the third embodiment will operate as follows: When the key-operated switch 5 is closed to start the engine, a field current flows through the field coil 102 in a loop composed of the storage battery 4, the key-operated switch 5, the transistor 700, the resistor 702, the diode 703, the field coil 102, and the transistors 302, 303, causing a magnetomotive force to be induced across the field coil 102. At this time, the transistor 700 is controlled at all times by the oscillator 11 through the diode 709 so as to be turned on and off.

Figure 5:
FIGS. 5 through 8 are diagrams illustrative of the waveforms of voltages and currents in the circuit shown in FIG. 4.
Figure 6:
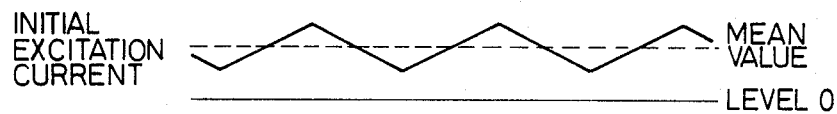
Figure 7:
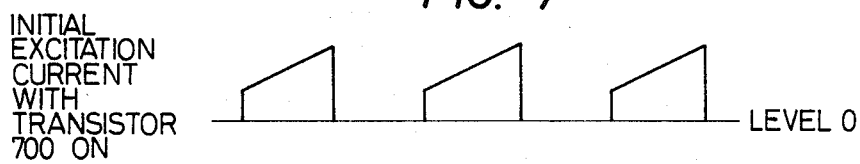

FIG. 5 shows the waveform of an oscillating output of the oscillator 11, and FIG. 6 illustrates the waveform of an initial excitation current supplied to the field coil 102. As shown, the field current gradually increases when the transistor 700 is energized under the influence of the inductance of the field coil 102, and gradually decreases through the surge absorber diode 301 when the transistor 700 is de-energized. FIG. 7 shows the waveform of an initial excitation current supplied from the storage battery 4 when the transistor 700 is energized, and FIG. 8 is illustrative of the waveform of a voltage at the second rectifier output terminal 202 when no power is generated by the generator 1.

The resistance between the voltage setting terminal 710 and ground in the switch unit 7 is equal to the resistance of the resistor 708 added in parallel to the series added resistances of the resistor 707, the field coil 102, and the resistor 702 as they are multiplied by a current amplification factor of the transistor 700. The voltage at the voltage setting terminal 710 is determined by the ratio of the above total parallel resistances to the resistance of the resistance 707. The voltage at the voltage setting terminal 710 at the time of an opening in the interval between the second rectifier output terminal 202 and ground in the exciter circuit is selected to be lower than the second preset value which represents no power generation. The maximum value of the initial excitation current flowing through the transistor 700 is determined by the following calculations: From the voltage at the voltage setting terminal 710 are substracted the base-to-emitter voltage of the transistor 700, the voltage drop across the diode 703, and the collector-to-emitter voltage of the transistor 302, and the result is divided by the total resistance of the field coil 102 and the resistor 702. The quotient is indicative of the maximum initial excitation current. The mean value of the initial excitation current is set by the oscillation frequency of the oscillator 11. Since the voltage at the voltage setting unit 710 is selected to be smaller than the second preset value at the time of wire breakage in the excitation circuit, the zener diode 808 in the diagnostic device 8 is rendered nonconductive and the transistor 807 is turned off at the time of starting. With the transistor 807 off, the transistors 9, 10 are supplied with a base current through the resistor 806 and the diode 804 and are rendered conductive, whereupon the charging indicator lamp 6 is energized. When the engine is then started to enable the generator 1 to generate an output voltage controlled to equal the first preset value by the voltage regulator 3, the charging indicator lamp 6 is de-energized.

Figure 8:
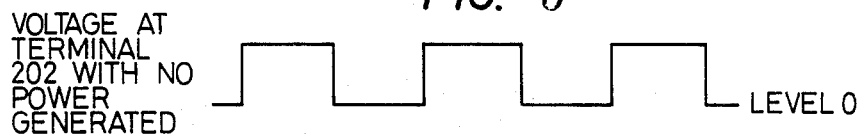

If the field coil 102, which is part of the exciter circuit, the transistors 302, 303, or other wires happen to be opened or broken, the voltage at the second rectifier output terminal 202 has a waveform as shown in FIG. 8. Under this condition, the voltage at the voltage setting terminal 710 is selected to be lower than the second preset value even when the transistor 700 is turned on. Therefore, the voltage at the second rectifier output terminal 202 is smaller than the second preset value, and the charging indicator lamp 6 is energized at the same time that the generator 1 starts operating, thus indicating no power generation. The transistor 807 and the zener diode 808 may be replaced with a comparator circuit.

When the output voltage from the generator 1 cannot be controlled to the first preset value, due, for example, to a failure of the voltage regulator 3, and is caused to reach the third value by which the storage battery 4 would be excessively charged, the voltage at the dividing point between the resistors 812, 813 is increased. Therefore, the zener diode 811 is rendered conductive to supply the base current through the diode 805 to the transistors 9, 10 which are rendered conductive, whereupon the charging indicator lamp 6 is turned on. In case the generator 1 generates power but fails to charge the storage battery 4 due to detachment of the first rectifier output terminal 201, for instance, a voltage having a waveform as shown in FIG. 2 appears at the first and second rectifier output terminals 201, 202, as described above with reference to the first embodiment. There are intervals in which the voltage exceeds the third preset value as shown in FIG. 2. During such intervals, the zener diode 811 is rendered conductive, and the transistors 9, 10 are intermittently supplied with the base current via the diode 805. However, the capacitor 803 allows the transistors 9, 10 to be maintained conductive, thus energizing the charging indicator lamp 6.

The zener diode 811 may be replaced with a comparator circuit. The resistor 702 may be dispensed with by lowering the voltage at the voltage setting terminal 710.

When the wire between the junction between the key-operated switch 5 and the charging indicator lamp 6 and the collector of the transistor 700 happens to be broken, the base current flows to the transistors 9, 10 from the storage battery 4 via the key-operated switch 5, the charging indicator lamp 6, the diode 814, the resistor 806, and the diode 804. The transistors 9, 10 are then rendered conductive to turn on the charging indicator lamp 6.

Figure 9:
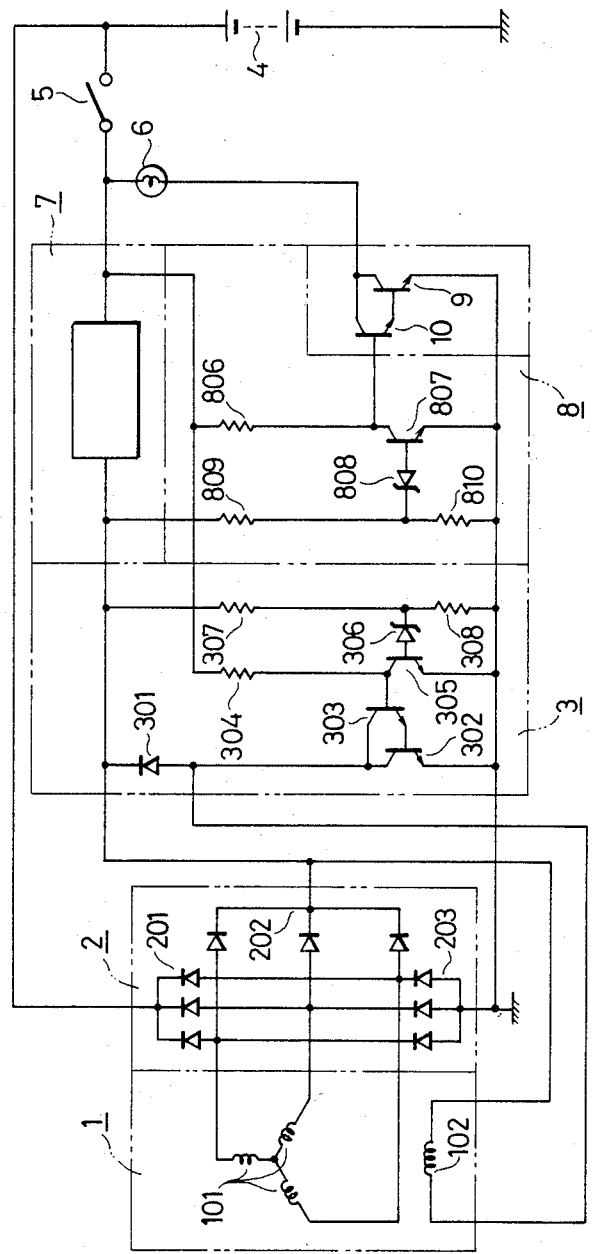
FIGS. 9 and 10 are circuit diagrams each illustrating a modification of the apparatus shown in FIG. 1.
Figure 10:
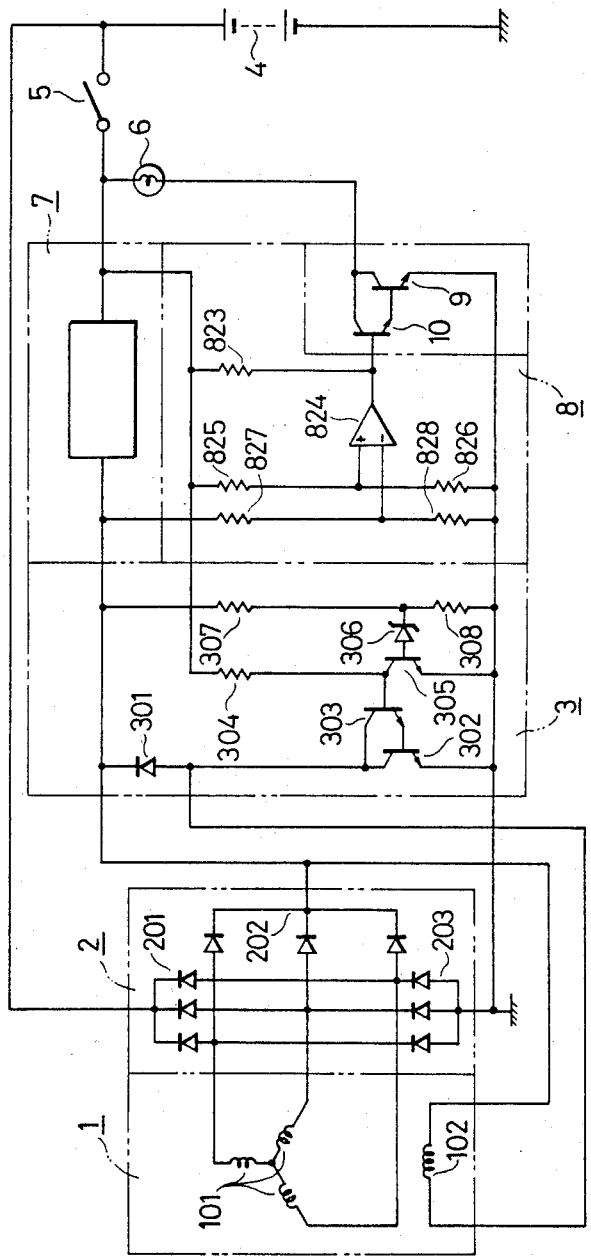

As shown in FIG. 9, the apparatus of FIG. 1 may be modified by deleting the resistors 812 and 813, the Zener diode 811 and diodes 804 and 805 in order to indicate only a malfunction such as wire breakage in the exciter circuit. Further, the same function as that of the circuit shown in FIG. 9 can be obtained by the use of a comparator 824 as shown in FIG. 10.

Figure 11:
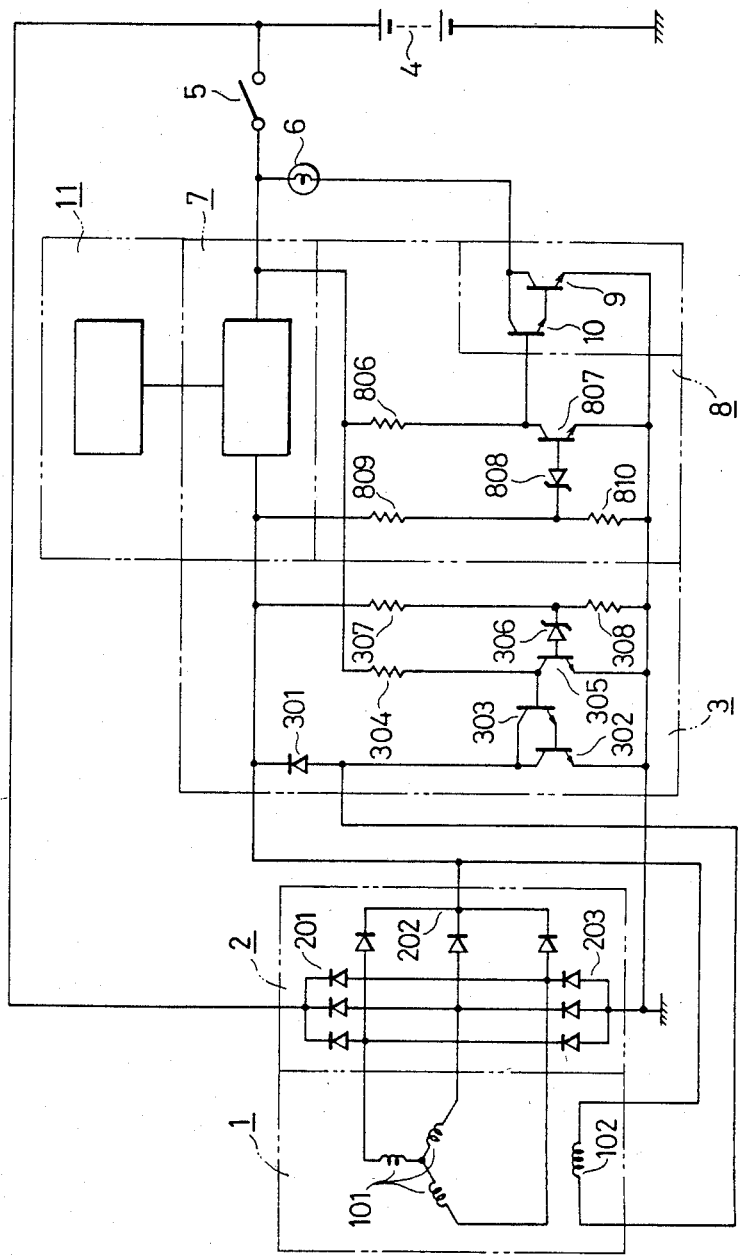
FIGS. 11 and 12 are circuit diagrams each illustrating a modification of the apparatus shown in FIG. 4.
Figure 12:
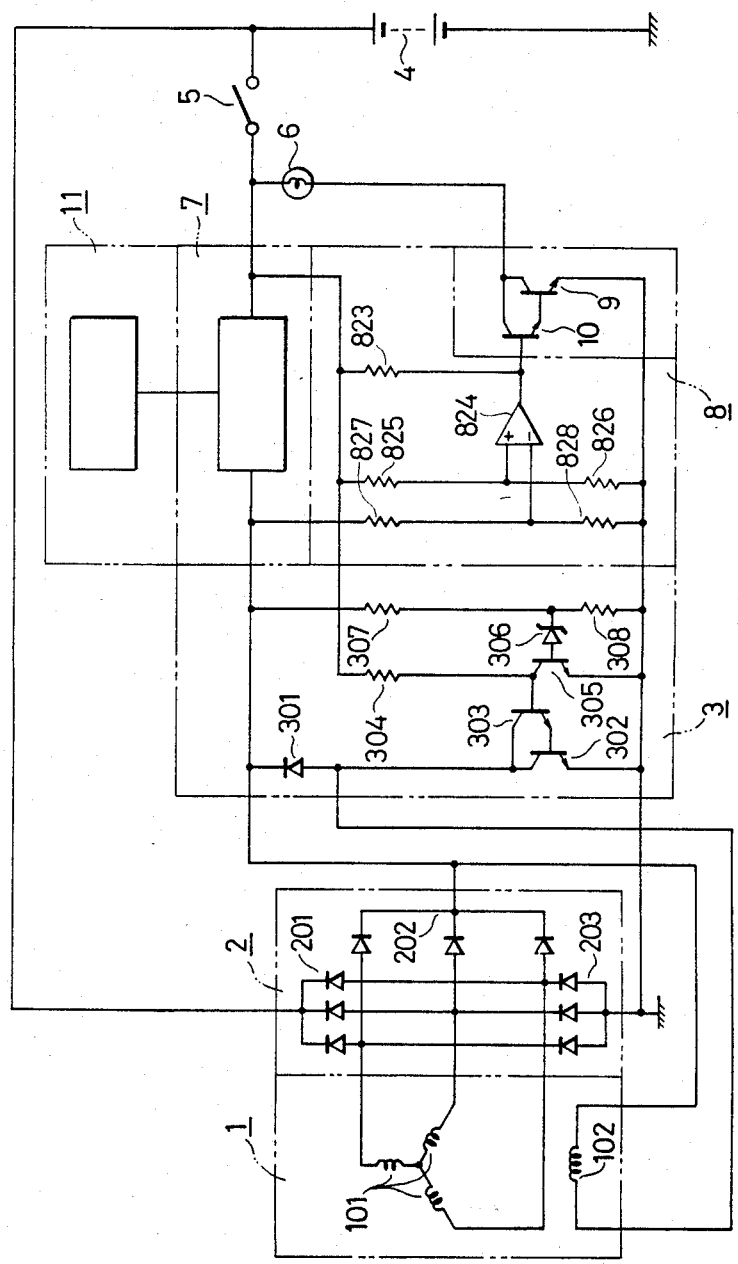

FIG. 11 is a circuit diagram showing a modification of the apparatus shown in FIG. 4, which is only capable of indicating a non-generating state caused by a malfunction such as wire breakage in the exciter circuit. A comparator 824 may be used instead of the Zener diode 808 and the transistor 807 as shown in FIG. 12, such that the same function of the apparatus of FIG. 11 may be obtained.

Although certain preferred embodiments have been shown and described, it should be understood that many changes and modifications may be made therein without departing from the scope of the appended claims.

What is claimed is:

1. An apparatus for controlling a charging generator having armature coils and a field coil, comprising:
   (a) a rectifier for rectifying an a.c. output induced in said armature coils, said rectifier having a first rectifier output terminal, a second rectifier output terminal, and a ground terminal;
   (b) a storage battery chargeable by an output from said first rectifier output terminal;
   (c) a voltage regulator for turning a current flowing form said second rectifier output terminal to the field coil on and off to control an output voltage of the charging generator so as to be maintained at a preset value;
   (d) a switch;
   (e) an indicator connected between said storage battery and said ground terminal through said switch;
   (f) a switch element connected in series between said indicator and said ground terminal;
   (g) diagnostic means for detecting malfunctions of the charging generator for rendering said switch element conductive; and
   (h) a switch unit connected between said switch and said second rectifier output terminal and comprising a thyristor having a gate and a zener diode connected to said gate.

2. An apparatus as claimed in claim 1, wherein said switch unit comprises a thyristor having a gate and a zener diode connected to said gate.

3. An apparatus as claimed in claim 1, wherein said switch unit comprises a transistor having a base and a resistor connected to said base.

4. An apparatus as claimed in claim 1, wherein said switch element comprises a pair of Darlington-connected transistors, said switch unit comprises a thyristor having a gate and a zener diode connected to said gate, and said switch comprises a key-operated switch.

5. An apparatus as claimed in claim 1, wherein said diagnostic means comprises a transistor having a base, and a zener diode connected between said base and said second rectifier output terminal.

6. An apparatus as claimed in claim 1, wherein said switch element comprises a transistor having a base, and a zener diode connected between said base and said second rectifier output terminal.

7. An apparatus as claimed in claim 5, wherein said switch element comprises a transistor having a base, and a zener diode connected between said base and said second rectifier output terminal.

8. An apparatus for controlling a charging generator having armature coils and a field coil, comprising:
   (a) a rectifier for rectifying an a.c. output induced in said armature coils, said rectifier having a first rectifier output terminal, a second rectifier output terminal, and a ground terminal;
   (b) a storage battery chargeable by an output from said first rectifier output terminal;
   (c) a voltage regulator for turning current flowing from said second rectifier output terminal to the field coil on and off to control an output voltage of the charging generator so as to be maintained at a preset value;
   (d) a switch;
   (e) an indicator connected between said storage battery and said ground terminal through said switch;
   (f) a switch element connected in series between said indicator and said ground terminal;
   (g) a diagnostic device for detecting malfunctions of the charging generator for rendering said switch element conductive;
   (h) a switch unit connected between said switch and said second rectifier output terminal; and
   (i) an oscillator for turning said switch unit on and off.

9. An apparatus as claimed in claim 8, wherein said switch unit comprises a transistor having a base and a resistor connected to said base.

10. An apparatus as claimed in claim 8, wherein said switch element comprises a pair of Darlington-connected transistors, said switch unit comprises a transistor having a base and a resistor connected to said base, and said switch comprises a key-operated switch.

11. An apparatus as claimed in claim 1, wherein said diagnostic means comprises means for monitoring a voltage developed at said second rectifier output terminal, and for allowing energization of said switch element in response to the occurrence of a voltage outside of a predetermined range.

12. An apparatus as claimed in claim 8, wherein said diagnostic means comprises means for monitoring a voltage developed at said second rectifier output terminal, and for allowing energization of said switch element in response to the occurrence of a voltage outside of a predetermined range.

13. An apparatus for controlling a charging generator having armature coils and a field coil, comprising:
   (a) a rectifier for rectifying an a.c. output induced in said armature coils, said rectifier having a first rectifier output terminal, a second rectifier output terminal, and a ground terminal;
   (b) a storage battery chargeable by an output from said first rectifier output terminal;
   (c) a voltage regulator for turning a current flowing from said second rectifier output terminal to the field coil on and off to control an output voltage of the charging generator so as to be maintained at a preset value;
   (d) a switch;
   (e) an indicator connected between said storage battery and said ground terminal through said switch;
   (f) a switch element connected in series between said indicator and said ground terminal comprising a pair of Darlington-connected transistors, said switch unit comprises a thyristor having a gate and a zener diode connected to said gate, and said switch comprises a key-operated switch;
   (g) a diagnostic device for detecting malfunctions of the charging generator for rendering said switch element conductive; and
   (h) a switch unit connected between said switch and said second rectifier output terminal.

14. An apparatus for controlling a charging generator having armature coils and a field coil, comprising:
   (a) a rectifier for rectifying an a.c. output induced in said armature coils, said rectifier having a first rectifier output terminal, a second rectifier output terminal, and a ground terminal;
   (b) a storage battery chargeable by an output from said first rectifier output terminal;
   (c) a voltage regulator for turning a current flowing from said second rectifier output terminal to the field coil on and off to control an output voltage of the charging generator so as to be maintained at a preset value;
   (d) a switch;
   (e) an indicator connected between said storage battery and said ground terminal through said switch;
   (f) a switch element connected in series between said indicator and said ground terminal, and comprising a transistor having a base, and a zener diode connected between said base and said second rectifier output terminal;
   (g) a diagnostic device for detecting malfunctions of the charging generator for rendering said switch element conductive and comprising a transistor having a base, and a zener diode connected between said base and said second rectifier output terminal; and
   (h) a switch unit connected between said switch and said second rectifier output terminal.

* * * * *